VARIABLE AMPLITUDE SELF-RECTIFYING OSCILLATOR
AND D.C. AMPLIFIER

Filed Nov. 13, 1962

EGILS H. EVALDS
JACOB MARLOW
INVENTORS
BY Robert L. Marben
ATTORNEY

United States Patent Office 3,246,257

Patented Apr. 12, 1966

3,246,257

VARIABLE AMPLITUDE SELF-RECTIFYING OSCILLATOR AND D.C. AMPLIFIER

Egils Herbert Evalds, Philadelphia, and Jacob Marlow, King of Prussia, Pa., assignors to Robertshaw Controls Company, a corporation of Delaware Filed Nov. 13, 1962, Ser. No. 237,013
5 Claims. (Cl. 331—109)

Figure 1:
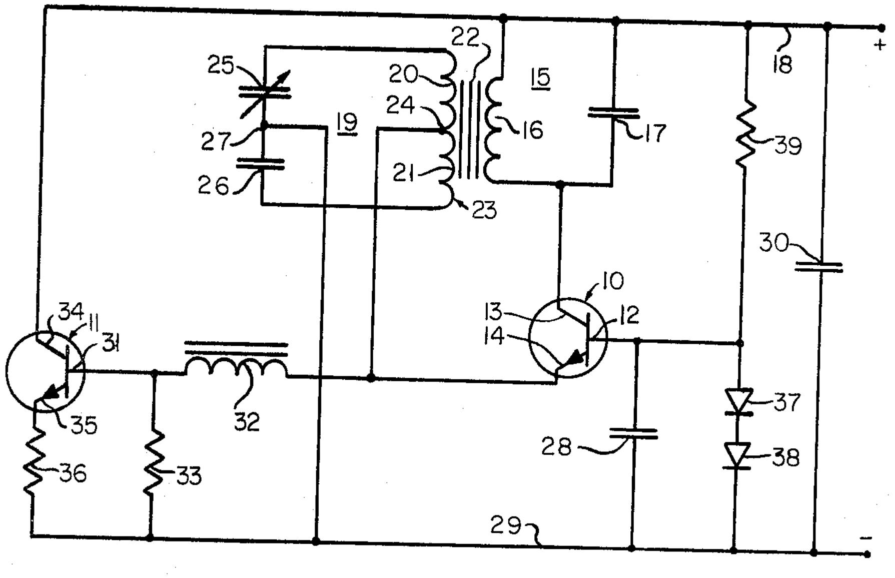

The invention presented herein relates to oscillator-amplifiers and, more particularly to solid-state oscillator-amplifiers especially useful in telemetering and control systems.

Telemetering and control systems using various electrical parameters such as current, voltage, and frequency to transmit information or control signals derived from a primary measurement to remote instruments or control devices have been known for a long while. Some current systems have been developed for operating with loads as high as several thousand ohms and use direct current of a few milliamperes. In many cases the quantity developed by the primary measurements is transformed basically to torque which produces an unbalance in the system. The unbalance is detected by some type of detector-amplifier causing the load current to change accordingly. In addition, such systems usually use a feedback signal to balance the input quantity to increase the stability, improve the linearity and reduce the requirement for voltage regulation of the power supply for the system.

Since many of the telemetering and control systems are used to provide control for manufacturing processes, it is important that the system be accurate, stable, require a minimum of maintenance and service and be insensitive to changes in ambient temperature which may vary over a wide range. Low operating voltage and current are also important to provide safe operating conditions. Simplication of the various components, reduction of parts and adjustments required will, of course, increase the reliability of a system. Some of the direct current transmitters use a vacuum tube type of oscillator-amplifier as the detector-amplifier and, therefore, require a separate power supply at the oscillator-amplifier for operation. This requires that lines in addition to those required for transmission of the control signal be installed or a separate source of power be available at the point of installation of the oscillator-amplifier. The advantages of having an oscillator-amplifier which is powered by the load current of the system instead of a separate power supply source are obvious. However, in view of the requirements imposed on such an oscillator-amplifier by the overall system and the environment in which it must be capable of operating, none of the prior art oscillator-amplifiers could be utilized or modified to provide a suitable oscillator-amplifier.

Accordingly, it is a primary object of the invention to provide a novel solid-state oscillator-amplifier suitable for use in direct current transmitting systems of the type described, which receives its power from the load current of the system that is transmitting over a single pair of conductors.

Another object of this invention is to provide a solid-state oscillator-amplifier which provides maximum utilization of its components.

A further object of this invention is to provide an oscillator-amplifier capable of operating over a wide range of temperature without the use of additional components and circuitry to provide temperature stabilization.

Still another object of this invention is to provide an oscillator-amplifier which has all the foregoing characteristics and yet requires a minimum of components and no adjustments.

These and other objects are attained by the solid-state oscillator-amplifier made in accordance with this invention. A self-rectifying oscillator is used which reduces the number of components required to provide the direct current signal to be amplified. Such an approach eliminates the need for a separate rectifying circuit between the oscillator and amplifier to rectify the high frequency signal produced by the oscillator. It also permits the oscillator and amplifier to be directly coupled further simplifying the circuitry and making it possible to use a simple biasing circuit which also provides excellent temperature compensation for the transistors thus eliminating the need for any elaborate temperature compensating circuits.

Figure 2:
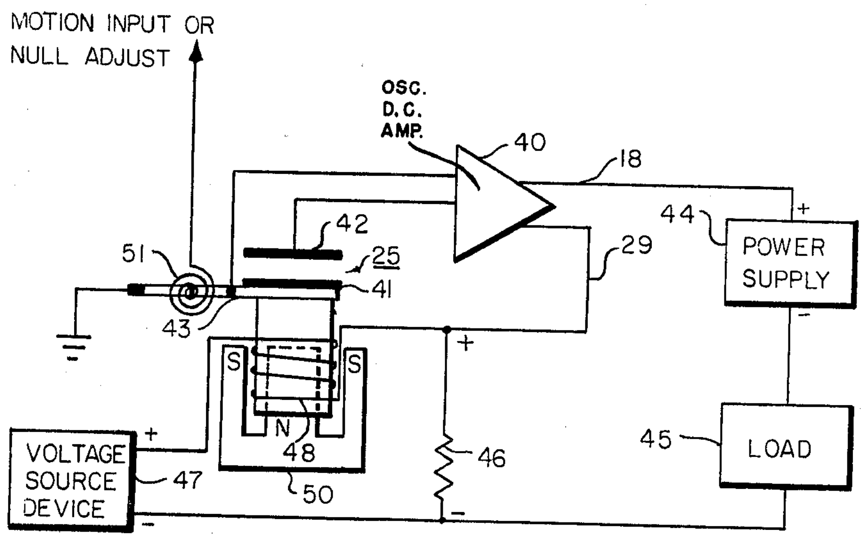

In order that the manner in which these and other objects are attained in accordance with the invention can be understood in detail, reference is had to the following description taken in connection with the accompanying drawing wherein:

FIG. 1 is a schematic diagram of an oscillator-amplifier embodying the invention; and FIG. 2 is a blocked diagram illustrating the type of current transmitting system in which the oscillator-amplifier of this invention is especially useful.

Referring now to the drawing in detail and to FIG. 1, a transistor 10 is connected as a self-rectifying variable amplitude oscillator which provides a direct current signal for driving transistor 11, which is connected as a direct current amplifier.

The oscillator portion of the circuit includes transistor 10 and a base electrode 12, collector electrode 13 and emitter electrode 14. The collector 13 is connected to one end of a parallel tuned circuit 15 including inductive winding 16 and capacitor 17. The other end of the tuned circuit 15 is connected to conductor 18 which is used to connect the oscillator-amplifier to the positive side of a series circuit including a load and a direct current power supply. The oscillator also includes a feedback circuit to provide a positive feedback signal which is applied to the emitter 14 and base 12 of transistor 10 to maintain the circuit in oscillation. The feedback circuit includes a four-leg inductance-capacitance bridge 19 inductively coupled to the tuned circuit 15. The bridge 19 has two inductance legs 20 and 21 inductively coupled to winding 16 by a core 22. The inductance legs 20 and 21 are formed from a single winding 23 on core 22 by the provision of a connection 24 intermediate the ends of windings 23. Two series connected capacitors 25 and 26 are connected in parallel with winding 23. The output of the bridge 19 which is fed back to the emitter 14 and base 12 of transistor 10 is taken from the connection 27 intermediate the capacitors 25 and 26 and connection 24. The emitter 14 is connected to connection 24, while base 12 is electrically connected to connector 27 via a capacitor 28. The side of capacitor 28 away from base 12 is connected to conductor 29 which provides the other conductor used to connect the oscillator-amplifier to the negative side of a series circuit including a load and a direct current power supply. A capacitor 30 is connected between conductors 18 and 29 and thus, between the tuned circuit 15 and the base 12 of transistor 10 to provide a high frequency path for the collector current of transistor 10. In addition, capacitor 30 also serves to smooth out the output current from transistor 11.

The feedback signal applied to the base 12 and emitter 14 of transistor 10 is rectified by the base-emitter junction of transistor 10 since the base-emitter junction presents a low impedance path for half of each cycle of the high frequency feedback signal and a high impedance path to the other half of each cycle. In addition to being connected to apply the output of bridge 19 to the base-emitter junction of transistor 10, the output of bridge 19 is also applied to transistor 11. Thus, emitter 14 of transistor 10 is connected to the base 31 of transistor 11 via a choke coil 32. In addition, the base 31 is connected to conductor 29 via a resistor 33. The coil 32, resistor 33 and transistor 11 thus provide a current path for each half-cycle of the output signal from bridge 19 where terminal 24 is positive with respect to terminal 27. The pulsating direct current signal that is thus applied across the coil 32 and resistor 33 is, of course, smoothed out by the action of coil 32.

The resistor 33 also serves to shunt the signal from the bridge circuit 19 making it possible for transistor 10 to oscillate at a low amplitude limit without turning on transistor 11. This, of course, is of value where the lower limit of the load current range is quite small. The value selected for resistor 33 must be such as to give reasonable input shunting of transistor 11 for the upper temperature range of operation of the circuit and at the same time prevent excessive current losses at the low temperature range of operation where transistor 11 requires a higher input voltage for a given output current. By using a resistor having a negative coefficient of resistance for resistor 33, the temperature compensation function of resistor 33 is improved.

The collector electrode 34 of transistor 11 is connected to conductor 18 while the emitter electrode 35 is connected to conductor 29 via resistor 36. The collector-emitter circuit of transistor 11 is thus connected between conductors 18 and 29 and is therefore in series with the power supply and load to which the oscillator-amplifier is connected for use. The direct current flowing via conductors 18 and 29 is thus controlled by transistor 11 which serves as a variable impedance under control of the half-wave cycles of one polarity of the output signal from bridge circuit 19 which in turn varies in amplitude in accordance with variations in the impedance of one or more legs of the bridge.

Resistor 36 is used to add some degeneration serving to stabilize the gain of transistor 11 and to increase and linearize the input impedance of transistor 11. The selection of the value for resistor 36 is limited to some degree by the need for operating transistor 11 initially near cutoff condition. This is necessary in order to have a high output current change for small oscillator current output changes without responding to an unwanted oscillator signal below a certain level which might be produced under extreme conditions.

Since transistors 10 and 11 are direct current coupled, it is possible to use a simple circuit to provide the desired bias for the transistors. The biasing voltage is developed across two series connected diodes 37 and 38. The anode of diode 37 is connected to conductor 18 via a resistor 39, while the cathode of diode 38 is connected to conductor 29. The voltage developed across the diodes is used as the biasing voltage for transistors 10 and 11 by electrically connecting the anode of diode 37 to the base of transistor 10. With such an arrangement the biasing voltage developed across the diodes 37 and 38 is determined by the "knee action" or initial forward voltage drop, making the bias voltage relatively independent of the voltage applied across resistor 39 and diodes 37 and 38. It should be noted that transistors 10 and 11 are of the same type. Thus in the embodiment shown in FIG. 1, NPN type transistors are used which have similar forward voltage drop between base-emitter junction. This, of course, also makes it possible to use the series connection diodes to develop the bias for the series connected base-emitter junctions of transistor 10 and transistor 11 since with such an arrangement the voltage drop across diodes 37 and 38 provides the bias voltage for transistors 10 and 11.

In addition, transistors 10 and 11 and diodes 37 and 38 are each made from the same semiconductor material, e.g., silicon, assuring the same forward voltage drops. This arrangement provides built-in temperature correction for the biasing voltage for transistor 10 and transistor 11 since the transistors and diodes will then have the same temperature coefficient. In this manner, the number of components needed to provide temperature compensation is kept to a minimum, while at the same time providing very good compensation.

It should be noted that transistor 10 is connected as a common base oscillator. This provides maximum isolation between the input and output of transistor 10 which is important since it permits the oscillator to be operated when the temperature, supply voltage and current vary over a wide range without shifting the operating point of the oscillator. Without this isolation the internal feedback paths, especially internal capacitances, which vary appreciably with supply voltage and temperature changes, would modify the operating point of the oscillator.

Operation of the oscillator-amplifier circuit is as follows: the output current of the circuit is varied by changing the output of the inductance-capacitance bridge 19 which may be accomplished by changing the impedance of any leg. In FIG. 1, capacitance leg 25 is shown as being variable. It is apparent that if the ratio of the capacitance of leg 25 to leg 26 is equal to the ratio of leg 20 to leg 21, there will be no output signal obtained from the bridge circuit 19. With the bridge in balance there is, of course, no feedback signal signal applied to transistor 10 and no sustained oscillations will take place. A high frequency signal is produced at the output of bridge 19 when capacitance 25 is increased or decreased. However, when capacitance 25 is increased, the output of bridge 19 will be 180° out of phase with the output of the bridge produced when capacitance 25 is decreased. Accordingly, variation of capacitance 25 in one direction develops the necessary positive feedback signal at the output of bridge 19 to sustain oscillations, while variation of capacitance 25 in the opposite direction from the balance point of the bridge results in an output signal of the opposite phase which will not support oscillations. Variation of capacitance 25 in the direction to provide a positive feedback signal is therefore used. The magnitude of the positive feedback signal also varies with the amount of change in capacitance 25 causing the amplitude of the oscillations to vary in accordance with the magnitude of the positive feedback signal. The amount of impedance change reflected back to the tuned circuit 15 by coupling between windings 23 and 16 is not sufficient to alter the frequency of oscillation materially. The oscillator is thus operated as a variable amplitude oscillator.

A ratio of 1:1 for the capacitance legs and the inductance legs can be used and will provide the highest voltage change per increment of change in capacitance 25. However, a ratio other than 1:1 can be used. In additions, if greater sensitivity is needed, capacitance legs 25 and 26 can be arranged so that each leg is varied, but in opposite directions. Thus, if plate type capacitors are used for the legs 25 and 26, output terminal 27 can be connected to a plate which is common to capacitors 25 and 26 and arranged for movement toward and away from the other plates of capacitors 25 and 26, or a movable plate can be used for each leg which are ganged together for movement.

With the oscillator operating, the feedback signal present at connections 24 and 27 of bridge 19 is applied across the base 12 and emitter 14 of transistor 10 via capacitor 28 and also across the choke coil 32 and resistor 33. For one-half of each cycle of the feedback signal, connection 24 is negative with respect to connection 27. During this half of each cycle the base emitter junction of transistor 10 presents a low impedance so there will be a current flow out of emitter 14 and none through coil 32 and resistor 33. However, for the half of each cycle when connector 24 is positive with respect to connector 27, the base 31 of transistor 11 is then positive with respect to the emitter 35 of transistor 11 causing transistor 11 to conduct to reduce the impedance of the emitter-collector circuit of transistor 11 thereby causing the direct current flow through conductors 18 and 29 to increase. Thus, transistor 10 is driven by half-cycles of the output from bridge 19 of one polarity to maintain the oscillator in oscillation while transistor 11 is driven by half-cycles of the opposite polarity to control the flow of direct current through conductors 18 and 29.

FIG. 2 illustrates the use of the oscillator-amplifier of the type shown in FIG. 1 for the detector-amplifier of a re-balancing type direct current transmitting system. The oscillator-amplifier is represented by the block designated by reference character 40 with only the variable capacitance leg 25 of bridge 19 presented in any detail. Plate 42 of capacitance 25 is fixed. The other plate 41 of capacitance 25 is mounted on one end of a pivoted balance beam 43. The conductor 18 of oscillator-amplifier 40 is connected to the positive terminal of a power supply 44 which has its negative terminal connected to one side of a load 45. The other side of load 45 is connected to conductor 29 of oscillator-amplifier 40 via a feedback resistor 46. The input signal to the system is represented as a voltage source device 47 connected via resistor 46 to a coil 48 carried by beam 43. A permanent magnet 50 forms an annular air gap in which coil 48 is allowed to move freely. The torque created by the product of the magnetic field of the permanent magnet and the magnetic field created by the current through coil 48 due to the voltage present at the output of the voltage source device 47 tends to move the beam 43 counterclockwise about its fulcrum point and, hence, increases the capacitance between plates 41 and 42. This change in capacitance is detected by the oscillator-amplifier 40 and is in such direction as to cause the current through the conductors 18 and 29 of oscillator-amplifier 40 to increase. The resultant feedback current passes through resistor 46 to oppose the current through resistor 46 due to voltage input device 47. The current through the coil 48 is thus reduced causing the beam 43 to rest at a new position. The difference between the new position and the original position before the voltage from the source 47 was applied is extremely small due to very high forward gain of the amplifier.

An oscillator-amplifier constructed in accordance with this invention can be used in direct current transmitting systems of the type described to provide proper operation in the temperature range from −40° to 212° Fahrenheit. In addition, the sensitivity of the oscillator-amplifier is such that the capacitor plate on the beam need move as little as one one-thousandth of an inch. This high gain, of course, provides linear current output-voltage input relationship, as well as low drift, high dynamic input and output impedances, and high accuracy. Further, it can be appreciated that the voltage between the capacitance plates must be kept low to minimize any error due to electrostatic forces between the plates of the capacitor. The oscillator-amplifier of the type described provides the voltage level such that the attraction force is negligible.

In an oscillator-amplifier constructed in accordance with the terms of the invention described herein, the following circuit elements and operating characteristics are found to be exemplary:

| | |
|---|---|
| Capacitor 26, pf. | 12 |
| Capacitor 17, pf. | 47 |
| Capacitor 28, pf. | 500 |
| Capacitor 30, pf. | 1500 |
| Inductor 32, mh. | .24 |
| Resistor 39, kilohms | 220 |
| Resistor 33, kilohms | 15 |
| Resistor 36, ohms | 68 |
| Transistor 10 | 2N915 |
| Transistor 11 | 2N2270 |
| Diodes 37 and 38 | 1N461 |
| Supply voltage | 32 v.±15% |
| Output current range, ma. | .25–30 |
| Operating temperature range | −40° F. to +212° F. |
| Plate 41–42 spacing, inch. | 0.005–0.006 |
| Load impedance, ohms | 0–3000 |
| Voltage across plates 41–42, below 5 volts R.M.S. | |

The frequency of oscillation of the oscillator section was about 4 megacycles.

Many modifications may be made in this invention without departing from the spirit of the invention as exemplified in the above described embodiment and described in the appended claims.

What is claimed is:

1. An oscillator-amplifier comprising: a controlled variable amplitude sinusoidal oscillator including a first transistor having a base-emitter junction and collector with a tuned circuit connected to said collector and a feedback circuit having an output, said feedback circuit inductively coupled to said tuned circuit providing a sinusoidal feedback signal at said output, said feedback circuit further including a variable impedance elements the variation of which is effective to change the magnitude of said sinusoidal feedback signal; a direct current amplifier including an input and a second transistor having a base-emitter junction; means electrically connecting said output of said feedback circuit to said input of said direct current amplifier and to said base-emitter junction of said first transistor; said base-emitter junction of said first transistor presenting a low impedance to one phase of said feedback signal to cause said first transistor to conduct to sustain the oscillations of said oscillator; and said base-emitter junction of said second transistor presenting a low impedance to the other phase of said feedback signal to cause said second transistor to conduct to provide a direct current output signal which is proportional to the amplitude of oscillations of said oscillator.

2. An oscillator-amplifier comprising: a controlled variable sinusoidal oscillator including a first transistor having a collector and a base-emitter junction with a tuned circuit connected to said collector and a feedback circuit having an output, said feedback circuit inductively coupled to said tuned circuit providing a sinusoidal feedback signal at said output, said feedback circuit including a variable impedance element the variation of which is effective to change the magnitude of the feedback signal, said oscillator also including a capacitor having one side connected to the base of said base-emitter junction and means electrically connecting the output of said feedback circuit to the emitter of said base-emitter junction and the other side of said capacitor, said base-emitter junction presenting a low impedance to one polarity of said feedback signal causing said first transistor to conduct to sustain and control the amplitude of oscillations; a first series circuit including a choke coil and a resistor with one end of said choke coil connected to the emitter of said base-emitter junction, one end of said resistor connected to the other end of said choke coil and the other end of said resistor connected to said other side of said capacitor; a direct current amplifier including a second transistor having a base-emitter junction and a second series circuit which is connected in parallel with said resistor, said second series circuit including said base-emitter junction of said second transistor with the base of said base-emitter junction of said second transistor connected to said other end of said resistor, the base-emitter junction of said second transistor presenting a low impedance to the other polarity of said feedback signal causing said second transistor to conduct to provide a direct current output signal which is proportional to the amplitude of oscillations of said oscillator.

3. An oscillator-amplifier for connection in series with the load and direct current source of a direct current transmitting system via a two-wire transmission line wherein the oscillator-amplifier is energized by the direct current source, said oscillator-amplifier comprising: a controlled variable amplitude sinusoidal oscillator; a direct current amplifier; said variable amplitude sinusoidal oscillator having a first transistor with an emitter, collector and base with a tuned circuit connected to said collector; said direct current amplifier having a second transistor with an emitter and a base; a first resistor connecting the base of said first transistor to one wire of the transmission line; a choke coil connecting the emitter of said first transistor to the base of said second transistor; means connecting the emitter of said second transistor to the other wire of the transmission line whereby the base-emitter of said first transistor is in series connection with the base-emitter of said second transistor; a capacitor connecting the base of said first transistor to the other wire of the transmission line; two series connected diodes connected between the base of said first transistor and the other wire of the transmission line which with said first resistor provides a biasing circuit whereby the voltage drop across said diodes is applied across the series connected base-emitter of said first transistor and the base-emitter of said second transistor as biasing voltage; a second resistor connecting the base of said second transistor to the other wire of the transmission line which with said choke coil forms an input circuit for said second transistor; said controlled variable amplitude sinusoidal oscillator having a feedback circuit inductively coupled to said tuned circuit and having an output providing a positive sinusoidal feedback signal; said feedback circuit including a variable impedance element the variation of which is effective to change the magnitude of the feedback signal; and means connecting said feedback circuit output to the end of said choke coil connected to the emitter of said first transistor and said other wire whereby said output of said feedback circuit is applied to said first transistor and said second transistor, said base and said emitter of said first transistor presenting a low impedance to one polarity of said feedback signal to sustain operation of said oscillator and said base and said emitter of said second transistor presenting a low impedance to the other polarity of said feedback signal to cause said second transistor to provide a direct current signal proportional to the amplitude of the oscillations as controlled by the variation of said impedance element in said feedback circuit.

4. An oscillator-amplifier in accordance with claim 3 wherein said feedback circuit includes a capacitance-inductance bridge which is inductively coupled to said tuned circuit, said bridge providing said output of said feedback circuit and said variable impedance element is a capacitor in said bridge, said capacitor having two plates one of which is movable with respect to the other plate.

5. An oscillator-amplifier in accordance with claim 3 wherein said second resistor has a negative temperature coefficient of resistance.

References Cited by the Examiner

UNITED STATES PATENTS

| | | | |
|---|---|---|---|
| 2,041,114 | 5/1936 | Carini | 331—138 |
| 2,757,475 | 8/1956 | Pankove. | |
| 2,954,527 | 9/1960 | Bradmiller | 331—109 X |
| 3,002,100 | 9/1961 | Hamilton | 331—112 X |
| 3,051,932 | 8/1962 | Cressey et al. | 331—65 X |
| 3,051,933 | 8/1962 | Cressey et al. | 331—109 X |
| 3,056,930 | 10/1962 | Berg | 331—112 X |
| 3,102,217 | 8/1963 | Bullen | 331—117 X |

ROY LAKE, *Primary Examiner.*

JOHN KOMINSKI, *Examiner.*